United States Patent [19]

Wassenberg

[11] Patent Number: 5,174,100
[45] Date of Patent: Dec. 29, 1992

[54] COMBINATION MOWER/TRIMMER APPARATUS

[76] Inventor: Brian E. Wassenberg, Rte. 2, Box 144B, Marysville, Kans. 66508

[21] Appl. No.: 681,920

[22] Filed: Apr. 8, 1991

[51] Int. Cl.[5] .......................................... A01D 34/68
[52] U.S. Cl. .................................... 56/12.7; 56/12.1; 56/16.9; 56/DIG. 17
[58] Field of Search ...................... 56/12.7, 12.1, 13.6, 56/13.7, 16.9, 17.5, 255, 295, DIG. 17, DIG. 20

[56] References Cited

U.S. PATENT DOCUMENTS

| | | | |
|---|---|---|---|
| 4,107,901 | 8/1978 | Moore | 56/17.5 |
| 4,153,563 | 4/1978 | Rosen et al. | 56/295 |
| 4,170,099 | 10/1979 | Owens | 56/16.9 |
| 4,176,508 | 12/1979 | Baumann et al. | 56/12.7 |
| 4,377,465 | 2/1983 | Comer | 56/12.7 |
| 4,452,033 | 6/1984 | Scramuzza | 56/12.7 |
| 4,453,372 | 6/1984 | Remer | 56/13.7 |
| 4,663,658 | 1/1987 | Nogawa | 56/255 |
| 4,726,176 | 2/1988 | McGrew | 56/12.7 |
| 4,823,542 | 4/1989 | Klever et al. | 56/17.5 |
| 4,896,488 | 1/1990 | Duncan et al. | 56/13.7 |
| 5,048,276 | 9/1991 | Miller | 56/16.9 |

Primary Examiner—Terry Lee Melius
Attorney, Agent, or Firm—Litman, McMahon & Brown

[57] ABSTRACT

A combination mower/trimmer apparatus comprises a mower with a body, a driven horizontally oriented blade member, and a trimmer assembly. The trimmer assembly includes a pair of spools for dispensing flexible trimming lines, guides for directing the lines along the blade member, an activating assembly for extending and retracting the trimming lines, and a line for feeding assembly to supply additional line during use. The apparatus includes a pair of pivotally mounted guards which normally seek an elevated position but which assume a lowered position when the respective guard is urged against an obstacle whereby a generally horizontal elongate slot in that guard aligns with a similar slot in the mower body such that extended trimming lines simultaneously trim vegetation along the obstacle as the blade member mows the vegetation adjacent thereto.

11 Claims, 2 Drawing Sheets

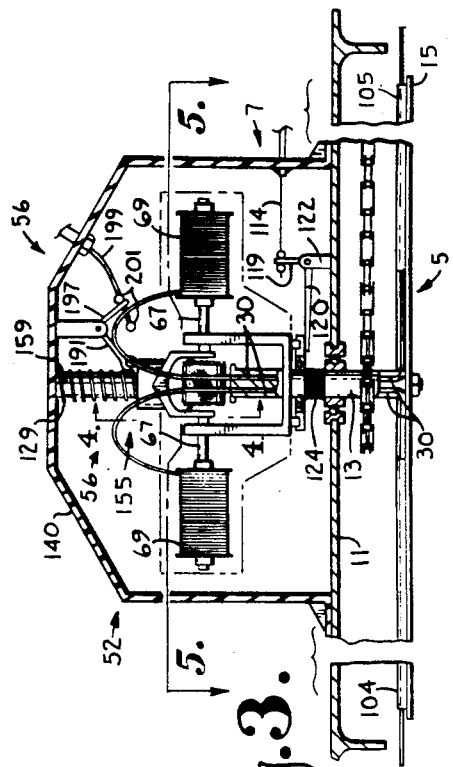
Fig.1.
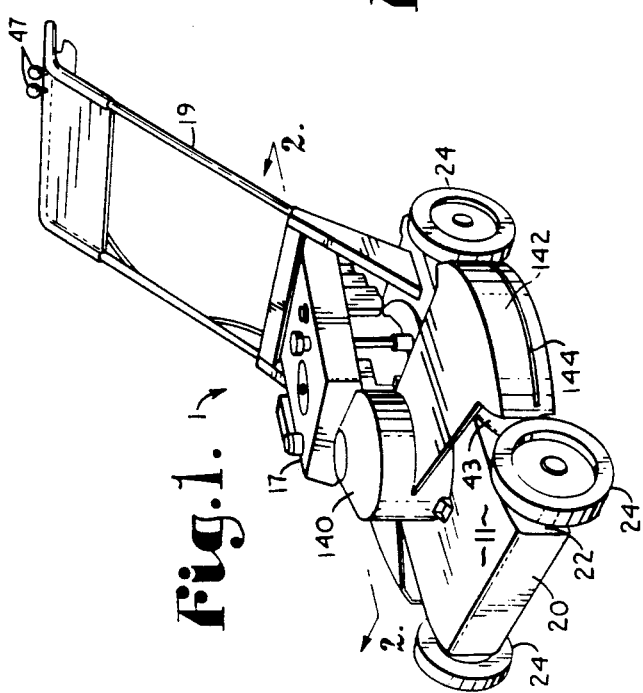
Fig.2.
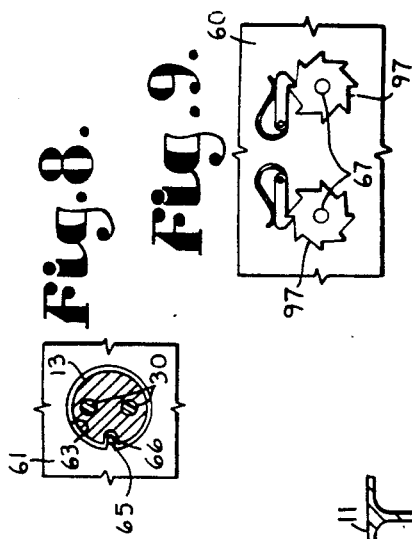
Fig.3.
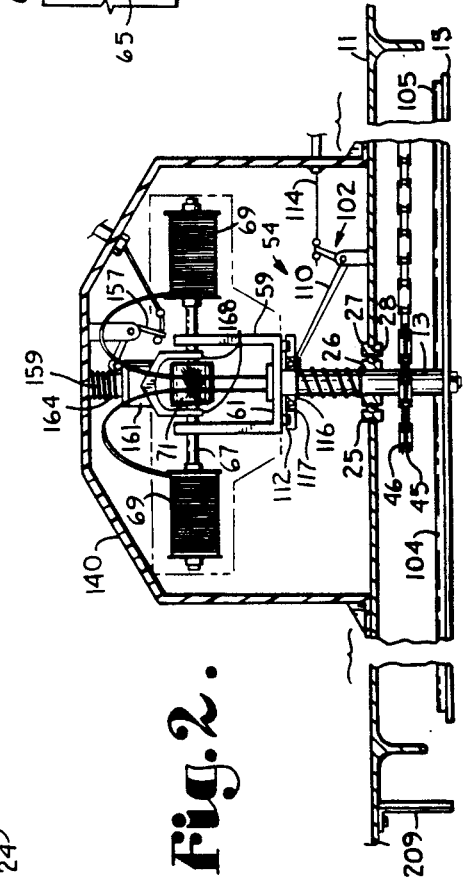
Fig.8.
Fig.9.

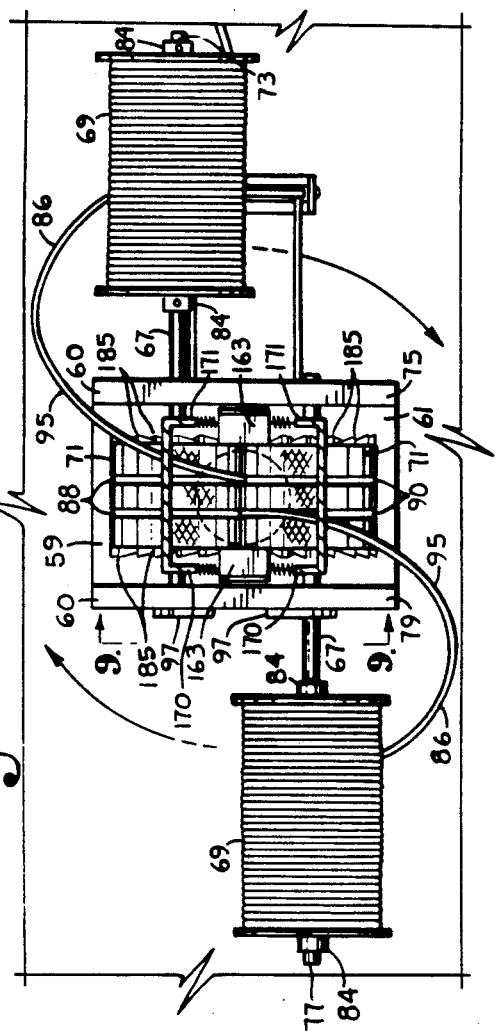
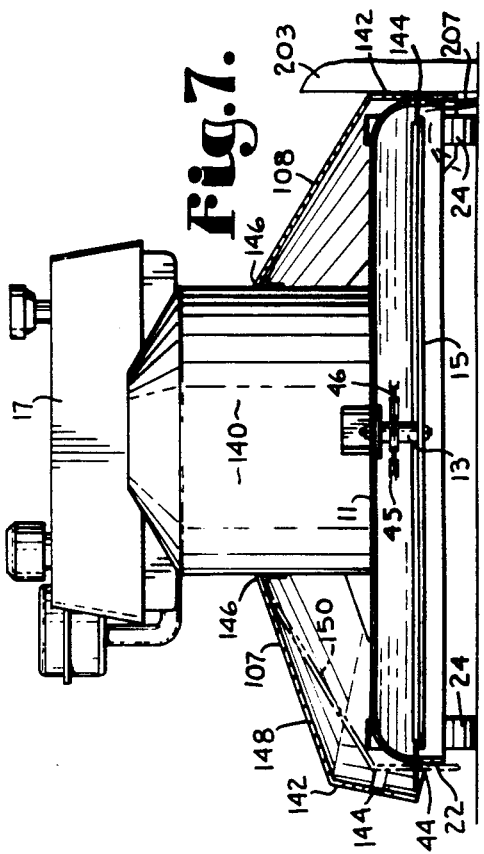
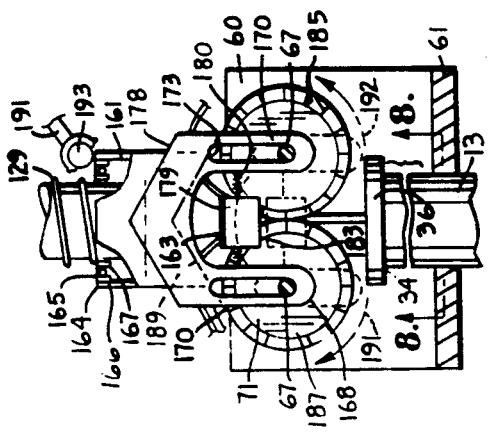
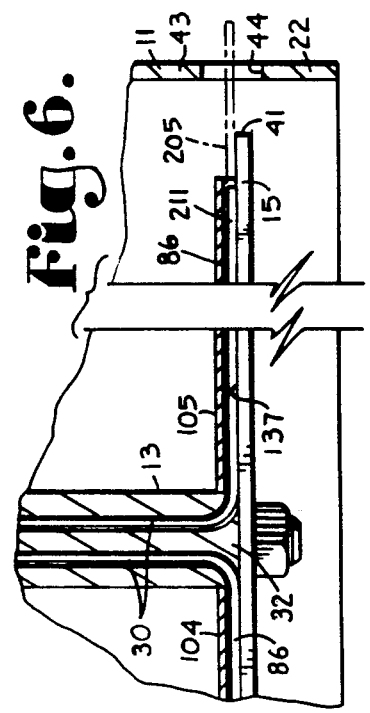

COMBINATION MOWER/TRIMMER APPARATUS

BACKGROUND OF THE INVENTION

1. Field of the Invention

The present invention relates generally to mowers and in particular to a combination mower and trimmer apparatus for simultaneously cutting and trimming vegetation along or around an obstacle.

2. Description of the Relevant Art

A variety of different types of mowing devices have been devised for meeting the requirements of particular mowing applications. For example, both powered and unpowered lawn mowers are available. Also available are lawn mowers that are designed to be ridden and are commonly referred to as "riding mowers". Other types of mowers can be pushed or guided by operators walking behind them. Unpowered, walk-behind type lawn mowers are propelled by people walking behind them; powered, walk-behind type lawn mowers can either be self-propelled or propelled by people walking behind them.

A common type of walk-behind lawn mower includes a wheeled body mounting a prime mover (e.g. a gasoline engine or an electric motor) which drives a blade assembly with a generally horizontal blade spinning below the body lower surface about a generally vertical rotational axis. A handle generally extends rearwardly from the body on this type of lawn mower for grasping by an operator walking behind it. The handle can include engine throttle controls, a safety clutch mechanism and similar types of controls This type of lawn mower is quite popular and is useful for many lawnmowing operations. However, a limitation with this type of lawn mower is that many of them are designed in such a way that they cannot approach solid, vertical objects (e.g. walls, trees, fences, etc.) very closely. Thus, uncut strips of vegetation are generally left adjacent to various obstacles after a lawn is mowed with such a conventional mower.

The adjacent strip remains uncut because, with many conventional mowers, the overall mower width is slightly greater than the cutting swath width whereby the mower cannot get close enough to an obstacle to mow all of the vegetation adjacent to it. Thus, a second, trimming operation is often required to effectively remove the resulting uncut strip of vegetation.

Trimming can be done with hand tools such as clippers, shears, etc., or with various powered devices, such as edgers, flexible line vegetation trimmers, etc. Flexible line vegetation trimmers are commonly used for such vegetation trimming operations adjacent to obstructions such as trees, buildings, poles, fences, etc. Thus, a popular lawn care procedure is to first mow an area with the lawn mower and then trim the remaining vegetation in hard-to-reach areas with a flexible line vegetation trimmer. Although the equipment for such a two-part procedure is available, the procedure involves a substantial duplication of effort since a lawn maintenance worker must guide both types of equipment over substantially the same areas adjacent to buildings and other vertical structures.

Even if a lawn mower were designed with a blade arc wider than any other part of the lawn mower, it would have limited usefulness since the rapidly whirling blade could significantly damage a structure that it came into contact with. The tips of the exposed blade could also be dangerous to persons and things that are exposed to them, and might shatter upon engagement with a hard object whereby broken blade parts could be dangerously propelled from the mower.

An important advantage of flexible line trimmers is that the flexible line generally does not seriously harm trees, buildings, and other structures when it is used for trimming adjacent vegetation. Furthermore, flexible line trimmers can be made compact enough for use in relatively small spaces which might be inaccessible to normal mowers. However, flexible line trimmers generally have considerably narrower cutting swaths than mowers, whereby the latter are generally preferred for mowing large areas. Thus, each type of vegetation cutting equipment has its own unique advantages and applications; and both types of equipment are often employed for particular lawn maintenance projects.

Heretofore, equipment has been proposed which combines some of the advantages of blade-type mowers with flexible line trimmers. For example, the Comer U.S. Pat. No. 4,374,465 shows a mowing device with lengths of flexible line attached to and extending outwardly from the blades. However, heretofore, there has not been available a mower which includes both blade and flexible line cutting systems which also includes the advantages and features of the present invention.

SUMMARY OF THE INVENTION

In the practice of the present invention, a mower is provided which includes a body with downturned sidewalls. Wheels are rotatably mounted on the body sidewalls and a handle extends rearwardly therefrom. A prime mover is mounted on the body. A spindle is rotatably mounted on the body and is drivingly connected to the prime mover such that the spindle has a generally vertical rotational axis. A blade member is mounted on the lower, distal end of spindle and extends generally horizontally. A flexible line feed system includes a pair of spool and guide roller assemblies with juxtaposed rotational axes. The guide rollers are juxtaposed and in close proximity with a cooperating pair of grooves for clampingly receiving and conveying the flexible line therebetween. Channels positioned below the cooperating grooves direct the line through opposing delivery tubes mounted on the blade member.

The line feeding assembly includes a plunger with four downwardly extending legs. A racheting mechanism includes ratchet teeth on adjacent ends of the guide rollers and a rachet finger extending between each adjacent pair of the plunger legs. The rachet fingers are adapted to drivingly engage the rachet teeth in a downstroke and to disengage the ratchet teeth in an upstroke. A cable is used to activate the line-feeding assembly, whereby additional line is supplied to replace line which has been worn away by use of the apparatus.

A trimmer activating assembly includes a thrust bearing to raise the line spool and guide roller assemblies for retracting the trimming lines and to lower those assemblies for extending the trimming lines.

A pair of guards, hingedly connected to opposite sides of a housing mounted on the body, are each movable between an elevated position, whereby a generally horizontally elongate slot in each of the guards is substantially non-aligned with coresponding slots in the downturned sidewalls of the body, and a lowered position, whereby the guard slot is substantially aligned with the respective body slot. In such lowered position and with the lines extended, the strip of vegetation along an obstacle is simultaneously trimmed as the other adjacent vegetation is mowed with the blade member.

OBJECTS AND ADVANTAGES OF THE INVENTION

The principal objects and advantages of the present invention include: providing a mower with improved characteristics; providing such a mower which includes a combination blade system and a flexible line system; providing such a mower with a flexible line system which can be used selectively; providing such a mower with a flexible line feed/retract system; providing such a mower wherein the flexible line can be extended or retracted while the mower is operating; providing such a mower wherein the flexible line system can be actuated by an operator with controls mounted on a handle of the mower; providing such a mower with side guards; providing such a mower wherein the guards can be elevated or lowered; providing such a mower wherein the guards are adapted to prevent some objects from being ejected from the sides of the mowers; providing such a mower which provides simultaneous vegetation cutting with a blade and a flexible line; providing such a mower which is adapted to reduce some of the labor and time associated with lawn maintenance; providing such a mower which is relatively safe to use; providing such a mower which is economical to manufacture, efficient in operation, capable of a long operating life and particularly well adapted for the uses thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a combination mower/trimmer apparatus, according to the present invention.

FIG. 2 is an enlarged, fragmentary and cross-sectional view of the combination mower/trimmer apparatus, taken generally along line 2—2 of FIG. 1, showing a pair of trimming lines thereof in a retracted configuration.

FIG. 3 is an enlarged, fragmentary and cross-sectional view of the combination mower/trimmer apparatus, similar to FIG. 2, but showing the pair of trimming lines in an extended configuration.

FIG. 4 is an enlarged, fragmentary elevational view of a pawl and rachet mechanism of the combination mower/trimmer apparatus, taken generally along line 4—4 of FIG. 3.

FIG. 5 is an enlarged and fragmentary plan view of a spool assembly of the combination mower/trimmer apparatus, taken generally along line 5—5 of FIG. 3.

FIG. 6 is an enlarged, fragmentary view of a blade and delivery tube of the combination mower/trimmer apparatus, showing the trimming line retracted in solid lines and the trimming line extended in phantom lines.

FIG. 7 is an enlarged and fragmentary elevational view of the combination mower/trimmer apparatus, showing a guard in cutting position (left side as viewed) and another guard in trimming position (right side as viewed).

FIG. 8 is an enlarged and cross-sectional view of a spindle of the combination mower/trimmer apparatus, generally taken along line 8—8 of FIG. 4.

FIG. 9 is an enlarged and elevational view of a pair of pawls and rachets of the combination mower/trimmer apparatus, generally taken along line 9—9 of FIG. 5, according to the present invention.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to a combination mower/trimmer apparatus in accordance with the present invention, as shown in FIGS. 1 through 9. The apparatus 1 includes a mower assembly 5 and a trimmer assembly 7.

The mower assembly includes a body 11, a blade assembly 12 such as a spindle 13 and a blade member 15, a prime mover 17, and a handle assembly 19. The body 11 has turned down endwalls 20 and sidewalls 22 and is mounted on and supported by a plurality of wheels 24. The wheels 24 are rotatably secured to the sidewalls 22 and are positioned near the lateral extremities of the body 11, as shown in FIG. 1.

The spindle 13 is rotatably mounted in a body bearing 25, having an inner race 26 and an outer race 27, which is rigidly mounted in a throughbore 28 in the body 11 such that the spindle 13 has a generally vertical rotational axis. The spindle 13 has a pair of channels 30 lengthwise therethrough with the channels 30 arcuately curving outwardly near a distal end 32 of the spindle 13 such that the channels 30 exit diametrically opposite from each other, as shown in FIG. 6. An upper end 34 of the spindle 13 has a flange 36.

The blade member 15 is rigidly mounted, substantially horizontally oriented, on the distal end 32 of the spindle 13 such that outer extremities 41 of the blade member 15 are spaced equidistantly from the spindle 13 and are operably spaced just within and in close proximity to the inside surfaces of a blade portion 43 of the sidewalls 22, as shown in FIG. 6. Each of the blade portions 43 has an elongate, substantially horizontally oriented slot 44 in line with, and extending slightly above, the blade member 15.

The prime mover 17, such as an electric motor, gasoline powered engine, or the like, is mounted on the body 11 and is drivingly connected to the spindle 13 by a drive chain means, such as a drive chain 45 and sprocket 46, or other suitable means. The handlebar arrangement 19 is secured to the body 11 to provide means for a user to manipulate and control the apparatus 1. Controls 47 mounted on the handle assembly 19 provide control means to control the apparatus 1 as hereinafter described.

The trimmer assembly 7 comprises a spool assembly 52, a trimmer activating assembly 54, and a line feeding assembly 56. The spool assembly 52 includes a U-shaped frame 59, having frame sidewalls 60 and frame bottom wall 61, a pair of axles 67, flexible line storage means such as a pair of spools 69, and a pair of guide rollers 71. The bottom wall 61 has an opening 63 therethrough, which is adapted to be easily slidable axially along the spindle 13. The opening 63 includes a protrusion 65 for traveling along a longitudinal groove 66, or other similar arrangement, to prevent rotation of the bottom wall 61 relative to the spindle 13, as shown in FIG. 8.

The axles 67 are mounted substantially parallel to each other in the frame sidewalls 60 such that a distal end 73 of one of the axles 67 substantially extends outwardly from one of the frame sidewalls 60, designated by the numeral 75 in FIG. 5, while a distal end 77 of the other one of the axles 67 substantially extends outwardly from the other one of the frame sidewalls 60, designated by the numeral 79 in FIG. 5. The axles 67 are rotatably mounted in the frame sidewalls 60 such that each is axially fixed relative to the sidewalls 60.

The spools 69 are rotatably mounted on the axles 67, with one of the spools 69 mounted on the axle distal end 73 and the other one of the spools 69 mounted on the axle distal end 77. The spools 69 are fixedly secured axially along the axles 67, equidistantly from the respective frame sidewall 60, with pairs of annular rings and setscrews 84, or the like. Flexible line 86, constructed of monofilament nylon or other suitable material, is wound about each one of the spools 69, as shown in FIG. 5.

One of each of the guide rollers 71 is fixedly mounted about a different one of the axles 67, as shown in FIG. 5. The guide rollers 71 are mounted on the axles 67 and include flexible line guide means for guiding the lines 86, such as a pair of peripheral grooves 88 about one of the guide rollers 71 aligned with a corresponding pair of peripheral grooves 90 about the other one of the guide rollers 71. The axles 67 are spaced apart such that a distal end 95 of the line 86 inserted in a corresponding pair of the grooves 88 and 90 is clamped between the guide rollers 71. A pawl and rachet mechanism 97 on each of the axles 67, as shown in FIG. 9, allows rotation of the guide rollers 71 such that the lines 86 clamped in the grooves 88 and 90 permits downward movement between the guide rollers 71 but prevents similar upward movement of the lines 86 therebetween.

The trimmer activating assembly 54 includes an activation mechanism 102, a pair of delivery tubes 104 and 105, and a pair of guards 107 and 108. The activation mechanism 102 includes an activation lever 110, a shifter 112, and an activation cable 114.

The shifter 112 is rotatably secured about the spindle 13 such that the shifter 112 can be easily axially displaced upwardly and downwardly along the spindle 13. The shifter 112 has an inner race 116 and an outer race 117. The activation lever 110 is generally L-shaped with two legs 119 and 120 and is pivotally secured to a bracket 122 secured to the body 11. The leg 119 is secured to the activation cable 114 and the leg 120 is secured to the outer race 117 of the shifter 112, as shown in FIGS. 2 and 3.

A compression spring 124 is disposed between the body bearing inner race 26 and the shifter inner race 116. The compression spring 124 surrounds the spindle 13 and, in conjunction with a tension spring 129, as hereinafter described, provides an upwardly directed bias to partially counterbalance the weight of the spool assembly 5 such that the spool assembly 5 remains in an upward, retracted configuration when the activation cable 114 is displaced to the right, as shown in FIG. 2, and the spool assembly 5 remains in a downward, extended configuration when the activation cable 14 is displaced to the left, as shown in FIG. 3.

The delivery tubes 104 and 105, with proximal ends communicating with the channels 30 and with distal ends which terminate near the outer extremities 41 of the blade member 15, are rigidly secured to an upper surface 137 of the blade member 15. The delivery tubes 104 and 105 are spaced and dimensioned to provide a continuation of the channels 30 along the blade member 15 such that each of the lines 86 inserted through a respective one of the channels 30 and a corresponding one of the delivery tubes 104 and 105 can be uninhibitedly extended and retracted therethrough.

A housing 140 is rigidly secured to the body 11 and is dimensioned such that the spool assembly 52, the trimmer activating assembly 54 and the line feeding assembly 56 contained therein can properly function without interference from the housing 140, while protection for those assemblies 52, 54 and 56 from the debris associated with a mowing and trimming environment is provided by the housing 140.

Each one of the guards 107 and 108 has a sidewall 142 with an elongate slot 144 and is pivotally secured to the housing 140 with a hinge 146, as shown in FIG. 7. Each of the hinges 146 includes a torsion spring (not shown) which causes the respective guard 107 or 108 to normally seek a slightly elevated position, as shown in solid lines at the left of FIG. 7 and designated by the numeral 148.

An inwardly directed bias against the guard sidewall 142 causes the respective guard, 107 or 108, to assume a position, shown in phantom lines at the left of FIG. 7 and designated by the numeral 150, whereat the guard slot 144 is substantially adjacent to, and aligned with, the respective body sidewall slot 44. Upon removal of the inwardly directed bias, the respective guard, 107 or 108, automatically returns to the slightly elevated position 148.

Means for rotating the guide rollers 71, such as the line feeding assembly 56, comprises a racheting or plunger mechanism 155 and a line-feed lever 157. The plunger mechanism 155 includes an alignment portion 159, a plunger or cage portion 161, and a pair of rachet fingers 163. The alignment portion 159 is generally cylindrically shaped and is rigidly secured to the housing 140 such that the alignment portion 159 is oriented substantially vertically and coaxially with the spindle 13.

An upper end 164 of the cage portion 161 has a bearing 165 with an outer race 166 rigidly secured to the cage portion 161 and an inner race 167 with a throughbore dimensioned slightly larger than the diameter of the alignment portion 159 such that the alignment portion 159 is axially slidable therethrough.

The cage portion 161 has four downwardly extending legs 168, with two of the legs 168, namely, legs 170, being substantially co-planar with each other, and the other two of the legs 168, namely, legs 171, also being substantially co-planar with each other. Each of the legs 168 has a substantially vertically oriented elongate slot 173, as shown in FIG. 4, having a width slightly greater than the diameter of the axles 67.

The legs 168 are disposed between the frame sidewalls 60 such that one of the axles 67 passes through one of the slots 173 in each of the legs 170 and 171 and the other one of the axles 67 passes through the other one of the slots 173 in each of the legs 170 and 171. The tension spring 129 is rigidly secured to the housing 140 and to the inner race 167 such that the cage portion 161 normally seeks an uppermost displacement, as shown by the solid lines in FIG. 4 and designated by the numeral 178.

One of the rachet fingers 163, such as finger 179, is pivotally mounted on a pin 180 secured between the legs 170, as shown in FIG. 4. Torsion springs 182 are connected to the legs 170 and the finger 179 such that an engagement end 183 of the finger 179 engages rachet teeth 185 peripherally spaced on each face 187 of the guide rollers 71. The teeth 185 are angled such that as the cage portion 161 is displaced downwardly, as shown by the phantom lines in FIG. 4 and designated by the numeral 189, the rachet finger 179 causes the guide rollers 71 to rotate as indicated by the arrows referenced by the numerals 191 and 192 in FIG. 4 and, as the cage portion 161 returns to the position 178, the engagement end 183 skips over the teeth 185.

Another one of the rachet fingers 163 is similarly secured between the legs 171 to similarly interface with the teeth 185 on the opposite faces 187 of the guide rollers 71. Alternatively, only one of the rachet fingers 163 may be needed or, one of the rachet fingers 163 may be used to interact with the teeth 185 of one of the guide rollers 71 while the other one of the rachet fingers 163 may be used to interact with the teeth 185 of the other one of the guide rollers 71.

The line-feed lever 157 is generally L-shaped with a thrust end 191 thereof containing a spherical bearing 193 for bearing against the upper end 164 of the cage portion 161 and a cable end 197 thereof for slidable displacement of a line-feed cable 199 therethrough. The line feed cable 199 has a pair of stops 201 which are sufficiently spaced apart to allow vertical movement of the trimmer activation assembly 54 without activating the line feeding assembly 56.

For use in wide-open spaces, the present invention is generally used similarly to other lawn mowers. The guards 107 and 108 remain in the normal, slightly elevated position 148 such that rocks and other debris thrown by the blade member 15 through the body slot 44 are deflected by the respective guard, 107 or 108, due to non-alignment of the guard slot 144 with the blade portion slot 44.

As the apparatus 1 is maneuvered along a vertical wall 203, as shown in FIG. 7, the respective guard 108 is caused to pivot by engagement with the wall 203, about the repective hinge 146 such that the respective guard slot 144 aligns with the blade portion slot 44. The activation lever 110 is then manipulated such that the activation mechanism 102 is displaced to the extended position, as shown in FIG. 3, such that the lines 86 are extended outwardly from the delivery tubes 104 and 105, as indicated in phantom and referenced by the numeral 205 in FIG. 6.

If the lines 86 do not sufficiently extend outwardly from the delivery tubes 104 and 105 in order to trim a narrow strip of grass 207 that would otherwise remain along the wall 203, then the line-feed lever 157 is manipulated to rachet more of the lines 86 from the spools 69 and direct same into the respective channels 30 and the delivery tubes 104 and 105. If an excess amount of the lines 86 extend outwardly from the delivery tubes 104 and 105, a cutter 209, rigidly secured to the body 11 and appropriately spaced relative to the spindle 13, trims the lines 86 to the desired length. After trimming along the wall 203, the activation lever 110 is then manipulated such that the activation mechanism 102 is returned to the retracted position, as shown in FIG. 2, such that the lines 86 are withdrawn into the delivery tubes 104 and 105, as indicated by the solid drawing lines referenced by the numeral 211 in FIG. 6.

It is to be understood that while certain forms of the present invention have been illustrated and described herein, it is not to be limited to the specific forms or arrangement of parts described and shown.

What is claimed and desired to be secured by Letters Patent is as follows:

1. A mower, which includes:
 (a) a body;
 (b) a prime mover mounted on said body;
 (c) a spindle rotatably mounted on said body and drivingly connected to said prime mover; said spindle having a generally vertical rotational axis and a distal end;
 (d) a blade member mounted on the distal end of said spindle and extending generally horizontally; and
 (e) a trimmer assembly also mounted on said spindle such that said trimmer assembly and said blade member have common generally vertical rotational axes, rotational velocities and direction of rotation; said trimmer assembly includes:
  (1) flexible line:
  (2) line guide means for operably maintaining distal ends of said flexible line substantially coplanar with said blade member; and
  (3) line storage means.

2. The invention of claim 1, including:
 (a) trimmer activating means for selectively activating said trimmer assembly; and
 (b) line feeding means for feeding line through said trimmer activating means.

3. The invention of claim 2 wherein:
 (a) said line storage means includes a spool for winding said flexible line thereon.

4. The invention of claim 3, which includes:
 (a) a pair of said flexible line spools extending transversely outwardly from said rotational axis in diametrically opposed directions.

5. The invention of claim 4, which includes:
 (a) a pair of guide rollers each mounted on a respective spool axle; each said guide roller being positioned in closely-spaced relation and forming a groove for clamping said flexible line therebetween; and
 (b) means for rotating said guide rollers.

6. The invention of claim 5 wherein said roller rotating means comprises:
 (a) a vertically movably plunger; and
 (b) a racheting mechanism selectively interconnecting said plunger and said guide rollers.

7. The invention of claim 6, which includes:
 (a) said plunger having a downward drive stroke rotating said guide rollers and an upward return stroke with said ratcheting mechanism disengaged.

8. The invention of claim 1 including:
 (a) a housing mounted on said body; and
 (b) a guard hingedly mounted on said housing and movable between an elevated position and a lowered position.

9. The invention of claim 2 wherein:
 (a) said trimmer activating means is movable between a lowered, extended-line configuration and an elevated, retracted line configuration.

10. The invention of claim 1 wherein:

(a) said prime mover is mounted rearwardly from said spindle rotational axis.

11. In combination with a mower including: a body with turned down sidewalls; wheels mounted on the body; a handle assembly mounted on the body; a prime mover mounted on the body; and a blade assembly including a spindle rotatably mounted on the body with a generally vertical rotational axis, a blade member mounted generally horizontally on the spindle, said blade member having distal ends; and drive train means drivingly interconnecting the prime mover and the spindle; the improvement of a flexible line vegetation cutting system, which comprises:

(a) an opposing pair of substantially horizontally oriented elongated body slots encompassing the cutting height of said blade member;

(b) a pair of delivery tubes each mounted on and extending longitudinally outwardly from the spindle along said blade member, each said tube having open proximal and distal ends and a bore extending therebetween, said tube proximal ends being positioned in spaced relation diametrically opposite to each other side of the spindle rotational axis;

(c) a trimmer assembly, which includes:
 (1) a frame vertically slidably mounted on said spindle upper end;
 (2) a pair of spool and guide roller assemblies mounted in opposing, staggered relation with respect to said rotational axis on said frame; each spool and guide roller assembly having a generally horizontal rotational axis, a spool for winding flexible line thereon, and a guide roller having an annular groove, said groove being positioned in opposed relation between said guide rollers and forming a line channel therebetween adapted to receive flexible line;
 (3) each said roller having rachet teeth on the planar end faces thereof;
 (4) a plunger assembly including a rachet finger for interacting with said rachet teeth;
 (5) a pair of channels each having an open, upper end positioned below said groove and a lower end communicating with a different one of said delivery tubes;
 (6) means for vertically moving said frame between its upper and lower positions; and
 (7) means for vertically moving said plunger assembly between its upper and lower positions;

(d) a housing mounted on said body; and (e) a pair of guards, each having a substantially horizontally oriented elongated slot and each mounted on a respective housing side; each said guard movable between a lower position, such that the respective slot thereof is substantially aligned with a respective one of the body slots, and an elevated position, such that the respective slot thereof is substantially non-aligned with the respective one of the body slots.

* * * * *